US008657671B2

(12) United States Patent
Ansari et al.

(10) Patent No.: US 8,657,671 B2
(45) Date of Patent: Feb. 25, 2014

(54) WAGERING GAME WITH TIME CONTROL ASPECTS

(75) Inventors: Marwan Ansari, Plainfield, IL (US); Jeremy Hornik, Chicago, IL (US); Larry Pacey, Chicago, IL (US); Alfred Thomas, Las Vegas, NV (US); John Walsh, Gurnee, IL (US)

(73) Assignee: WMS Gaming Inc., Waukegan, IL (US)

( * ) Notice: Subject to any disclaimer, the term of this patent is extended or adjusted under 35 U.S.C. 154(b) by 199 days.

(21) Appl. No.: 12/742,224

(22) PCT Filed: Nov. 7, 2008

(86) PCT No.: PCT/US2008/012579
§ 371 (c)(1), (2), (4) Date: Sep. 20, 2010

(87) PCT Pub. No.: WO2009/061476
PCT Pub. Date: May 14, 2009

(65) Prior Publication Data
US 2011/0003632 A1 Jan. 6, 2011

Related U.S. Application Data

(60) Provisional application No. 60/986,890, filed on Nov. 9, 2007.

(51) Int. Cl.
*A63F 9/24* (2006.01)
*A63F 13/00* (2006.01)

(52) U.S. Cl.
USPC .................................. 463/25; 463/30; 463/43

(58) Field of Classification Search
None
See application file for complete search history.

(56) References Cited

U.S. PATENT DOCUMENTS

| | | | | |
|---|---|---|---|---|
| 4,442,491 | A | 4/1984 | Olhausen, Jr. | |
| 5,261,820 | A | 11/1993 | Slye et al. | |
| 5,649,862 | A | 7/1997 | Sakaguchi et al. | |
| 6,159,100 | A | 12/2000 | Smith | |
| 6,354,940 | B1 | 3/2002 | Ito et al. | |
| 6,699,127 | B1 * | 3/2004 | Lobb et al. | 463/43 |
| 6,793,575 | B2 * | 9/2004 | Brown et al. | 463/6 |
| 7,160,191 | B2 | 1/2007 | Matsumoto | |
| 7,448,950 | B2 | 11/2008 | Matsumoto | |
| 7,497,779 | B2 | 3/2009 | O'Leary et al. | |
| 7,837,552 | B2 | 11/2010 | Sumi et al. | |
| 8,016,595 | B2 | 9/2011 | Aoki et al. | |
| 2002/0123380 | A1 | 9/2002 | Hirai et al. | |
| 2003/0043154 | A1 | 3/2003 | Nimura et al. | |
| 2004/0002380 | A1 * | 1/2004 | Brosnan et al. | 463/32 |
| 2004/0053686 | A1 * | 3/2004 | Pacey et al. | 463/25 |

(Continued)

OTHER PUBLICATIONS

"International Application Serial No. PCT/US2008/12579, Search Report mailed Jan. 15, 2009", 4 pgs.

(Continued)

*Primary Examiner* — David L Lewis
*Assistant Examiner* — Shauna-Kay Hall
(74) *Attorney, Agent, or Firm* — Nixon Peabody LLP

(57) ABSTRACT

Systems and methods provide time control aspects for a wagering game. A first portion of a wagering game may be presented at a first rate of motion through time and a second portion may be presented at a second rate of motion through time. Further, some graphical object may be displayed according to first rate of motion through time while other graphical objects are simultaneously display according to a second rate of motion through time. Additionally, a portion of a wagering game may be replayed from a previous point in time.

25 Claims, 11 Drawing Sheets

(56) References Cited

U.S. PATENT DOCUMENTS

| | | | | |
|---|---|---|---|---|
| 2004/0102244 | A1 * | 5/2004 | Kryuchkov et al. | 463/32 |
| 2004/0266536 | A1 * | 12/2004 | Mattice et al. | 463/43 |
| 2005/0233799 | A1 * | 10/2005 | LeMay et al. | 463/20 |
| 2006/0058100 | A1 * | 3/2006 | Pacey et al. | 463/31 |
| 2006/0148553 | A1 * | 7/2006 | Dodge | 463/20 |

OTHER PUBLICATIONS

"International Application Serial No. PCT/US2008/12579, Written Opinion mailed Jan. 15, 2009", 9 pgs.

"Australian Application Serial No. 2008325168, Examiners Report Mailed May 28, 2012", 2 Pgs.

"Australian Application Serial No. 2008325168, Response filed Apr. 9, 2013 to Examination Report, mailed May 28, 2012", 13 pgs.

"International Application Serial No. PCTUS2008012579, International Preliminary Report on Patentability Mailed Dec. 6, 2009", 14 Pgs.

Australian Patent Examination Report No. 3 mailed Nov. 8, 2013 which issued in corresponding Australian Patent Application No. 2008325168 (5 pages).

* cited by examiner

WAGERING GAME WITH TIME CONTROL ASPECTS

RELATED APPLICATION

This patent application is a U.S. National Stage Filing under 35 U.S.C. 371 from International Patent Application Serial No. PCT/US2008/012579, filed Nov. 7, 2008, and published on May 14, 2009, as WO 2009/061476 A1, which claims the priority benefit of U.S. Provisional Patent Application Ser. No. 60/986,890 filed Nov. 9, 2007, and entitled "WAGERING GAME WITH TIME CONTROL ASPECTS", the contents of which are incorporated herein by reference in their entirety.

FIELD

The embodiments relate generally to wagering game machines and more particularly to providing time control on wagering games presented on wagering game machines.

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever. Copyright ©2007, 2008, WMS Gaming Inc. All Rights Reserved.

BACKGROUND

Wagering game machine makers continually provide new and entertaining games. One way of increasing entertainment value associated with casino-style wagering games (e.g., video slots, video poker, video black jack, and the like) includes offering a variety of base games and bonus events. However, despite the variety of base games and bonus events, players often lose interest in repetitive wagering game content. In order to maintain player interest, wagering game machine makers frequently update wagering game content with new game themes, game settings, bonus events, game software, and other electronic data. Further, entertainment value may be increased by providing an enhanced visual game play experience.

DETAILED DESCRIPTION

Figure 1:
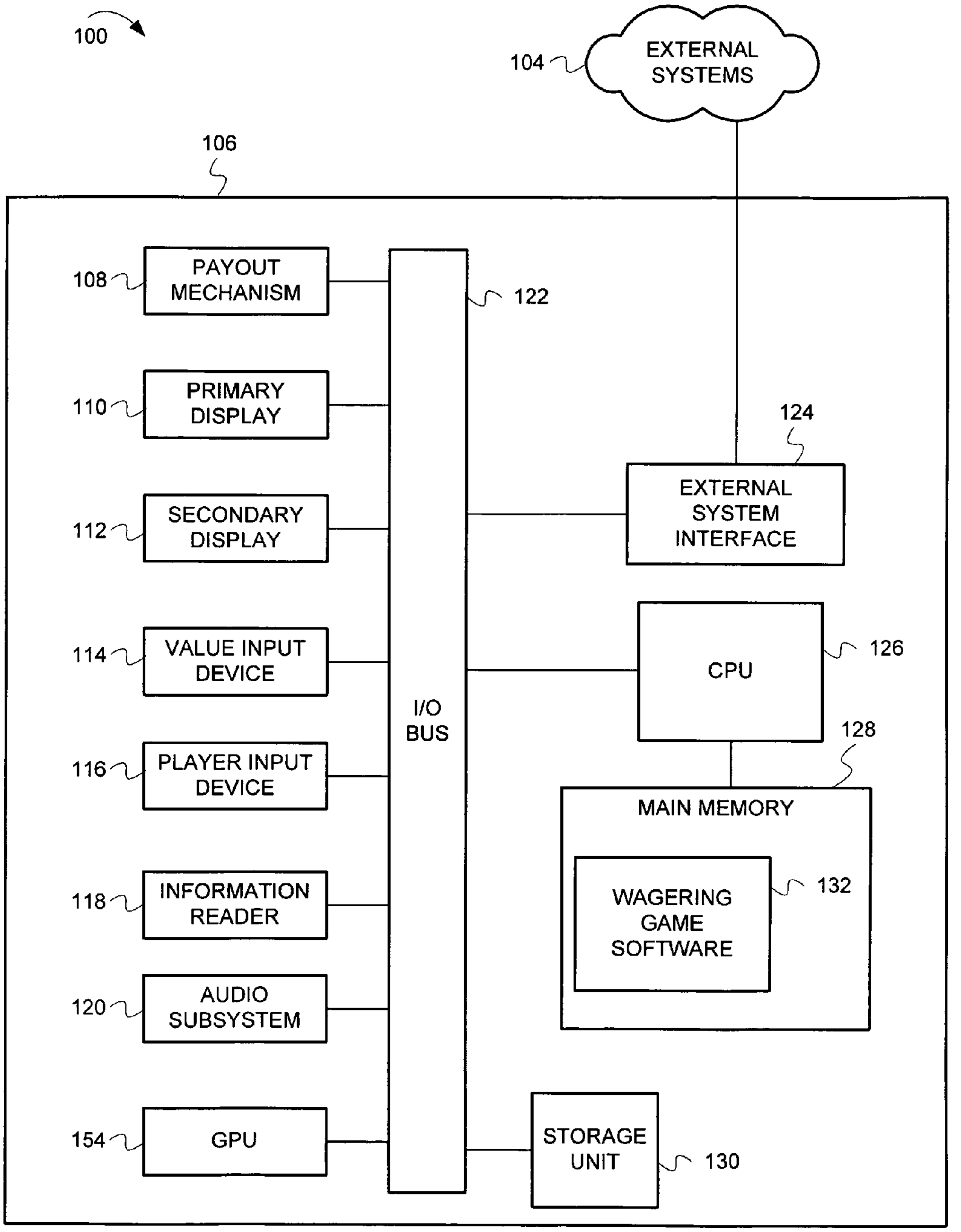
FIG. 1 is a block diagram of an architecture, including a control system, for a wagering game machine according to an example embodiment.

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the scope of the inventive subject matter.

Some portions of the detailed descriptions which follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

In the Figures, the same reference number is used throughout to refer to an identical component which appears in multiple Figures. Signals and connections may be referred to by the same reference number or label, and the actual meaning will be clear from its use in the context of the description.

In general, the system and method embodiments described below provide for the presentation of a wagering game on a wagering game machine where various portions, or various graphical objects or elements within the wagering game, may be presented at different rates of motion through time. Further embodiments provide for replaying a portion of a wagering game from a previous point in time of the presentation of the wagering game. These time control aspects of a wagering may provide for increased excitement and anticipation, provide opportunities for providing input (and thus the sense of more control) and provide opportunities to see details that would not be possible if a standard rate of motion through time were used.

The description of the various embodiments is to be construed as exemplary only and does not describe every possible instance of the invention. Numerous alternatives could be implemented, using combinations of current or future technologies, which would still fall within the scope of the claims. The following detailed description is, therefore, not to be taken in a limiting sense, and the scope of the present invention is defined only by the appended claims.

FIG. 1 is a block diagram illustrating a wagering game machine architecture 100, including a control system, according to example embodiments of the invention. As shown in FIG. 1, the wagering game machine 106 includes a central processing unit (processor) 126 connected to main memory 128, which may store wagering game software 132. In one embodiment, the wagering game software can include software associated with presenting wagering games, such as video poker, video black jack, video slots, video lottery, etc., in whole or part. In addition, wagering game software 132 may include bonus rounds, themes, advertising content, attract mode content, pay tables, denomination tables, audio files, video files, operating system files and other software associated with a wagering game or the operation of a wagering game machine.

The processor 126 is also connected to an input/output (I/O) bus 122, which facilitates communication between the wagering game machine's components. The I/O bus 122 may be connected to a payout mechanism 108, primary display 110, secondary display 112, value input device 114, player input device 116, information reader 118, and/or storage unit 130. The player input device 116 can include the value input device 114 to the extent the player input device 116 is used to place wagers. The I/O bus 122 may also be connected to an external system interface 124, which is connected to external systems 104 (e.g., wagering game networks).

In general, graphics processing unit 154 processes three-dimensional graphics data and may be included as part of primary display 110 and/or secondary display 112. Graphics processing unit 154 includes components that may be used to provide a real-time three-dimensional rendering of a three-dimensional space based on input data. Various graphics engines are known in the art and may be used in various embodiments of the invention. In some embodiments, the graphics engine comprises a RenderWare graphics engine, available from Criterion Software. Graphics processing unit 154 may be implemented in software, hardware, or a combination of software and hardware.

In some embodiments, graphics processing unit 154 provides a set of one or more components that provide real-time three dimensional computer graphics for a wagering game application or other software running on a wagering game machine. Graphics processing unit 154 may also be referred to as a game engine. In some embodiments, graphics processing unit 154 provides an underlying set of technologies in an operating system independent manner such that a wagering game may be easily adapted to run on multiple platforms, including various hardware platforms such as stand-alone and portable wagering game machines and various software platforms such as Linux, UNIX, Mac OS X and Microsoft Windows families of operating systems. In some embodiments, graphics processing unit 154 may include various combinations of one or more components such as a rendering engine ("renderer") for two dimensional or three dimensional graphics, a physics engine and/or components providing collision detection, sound, scripting, animation, artificial intelligence, networking, and scene graphs. A scene graph is generally considered to be an object-oriented representation of a three dimensional game world and is designed for efficient rendering of vast virtual worlds. Thus in various embodiments, a real-time rendering of a three-dimensional model such as a scene graph is provided for a wagering game application or other software operating on a wagering game machine.

The components described above may be implemented in various combinations of software, hardware and/or firmware. Further, while shown as part of a control system 100 for a wagering game machine, graphics processing unit 154 or portions thereof may reside on systems external to the wagering game machine, such as on a game server.

In some embodiments, the components of graphics processing unit 154 may be replaced or extended with more specialized components. For example, in particular embodiments, graphics processing unit 154 may be provided as a series of loosely connected components that can be selectively combined to create a custom graphics engine for a wagering game application.

As noted above, various components may be present in a graphics processing unit 154. Some graphics engines provide real-time 3D rendering capabilities while other components outside of the graphics engine provide other functionality used by wagering games. These types of graphics engines 140 may be referred to as a "rendering engine," or "3D engine".

In some embodiments, the graphics processing unit 154 may utilize and be designed substantially in accordance with various versions of a graphics API such as Direct3D or OpenGL which provides a software abstraction of a graphics processing unit or video card. Further, in some embodiments, low-level libraries such as DirectX, SDL (Simple DirectMedia Layer), and OpenAL may also be used in presenting a wagering game in order to assist in providing hardware-independent access to other computer hardware such as input devices (mouse, keyboard, and joystick), network cards, and sound cards.

Figure 3:
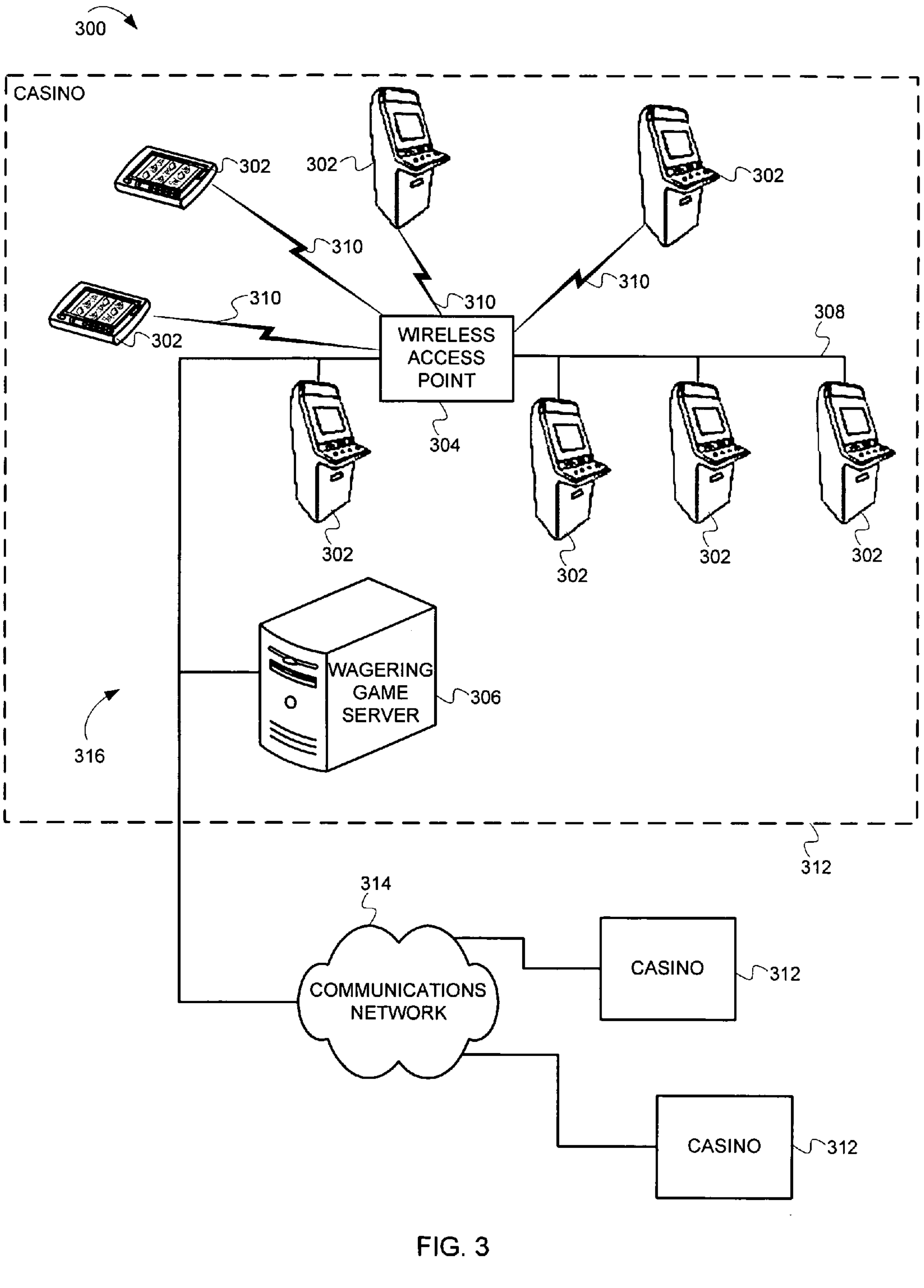
FIG. 3 is a block diagram of a networked system of wagering game machines and servers according to example embodiments.

Wagering game software 132 may be loaded from storage unit 130, or it may be loaded from external systems 104 such as servers of other systems on a wagering game network (as illustrated in FIG. 3). In general, wagering game software 132 comprises modules or units that operate to present one or more wagering game upon which monetary value may be wagered. During the course of presenting the wagering games, images composed of graphical objects are displayed on primary display 110 and/or secondary display 112. The graphical objects may represent various wagering game elements such as reels, cards, dice, symbols, animations, etc., and may also represent elements of a bonus round or other ancillary wagering game software component.

Some embodiments of the invention include an audio subsystem 120. Audio subsystem 120 provides audio capabilities to the wagering game machine and may comprise an audio amplifier coupled to speakers or an audio jack, and may further include an audio programming source on a memory such as a CD, DVD, flash memory etc.

In one embodiment, the wagering game machine 106 can include additional peripheral devices and/or more than one of each component shown in FIG. 1. For example, the peripherals may include a bill validator, a printer, a coin hopper, a button panel, or any of the many peripherals now found in wagering game machines or developed in the future. Further, in some embodiments, the wagering game machine 106 can include multiple external system interfaces 124 and multiple processors 126. In one embodiment, any of the components can be integrated or subdivided. Additionally, in one embodiment, the components of the wagering game machine 106 can be interconnected according to any suitable interconnection architecture (e.g., directly connected, hypercube, etc.).

In one embodiment, any of the components of the wagering game machine architecture 100 (e.g., the wagering game presentation unit 132 or portable wagering game management unit) can include hardware, firmware, and/or software for performing the operations described herein. Machine-readable media includes any mechanism that provides (i.e., stores and/or transmits) information in a form readable by a machine (e.g., a wagering game machine, computer, etc.). For example, tangible machine-readable media includes read only memory (ROM), random access memory (RAM), magnetic disk storage media, optical storage media, flash memory machines, etc. Machine-readable media also includes any media suitable for transmitting software over a network.

In operation, a player may use the portable wagering game machine to activate a play of a wagering game on the machine. Using the available input mechanisms such as value input device 114 or devices coupled through player input device 116, the player may select any variables associated with the wagering game and place his/her wager to purchase a play of the game. In a play of the game, the processor 126 generates at least one random event using a random number generator (RNG) and provides an award to the player for a winning outcome of the random event. Alternatively, the random event may be generated by a remote computer using an RNG or pooling schema and then transmitted to the wagering game machine. The processor 126 operates the display 114 to represent the random event(s) and outcome(s) in a visual form that can be understood by the player. In some embodiments, a wagering game segment may be triggered based on certain events. For example, a bonus round may be triggered.

Figure 2:
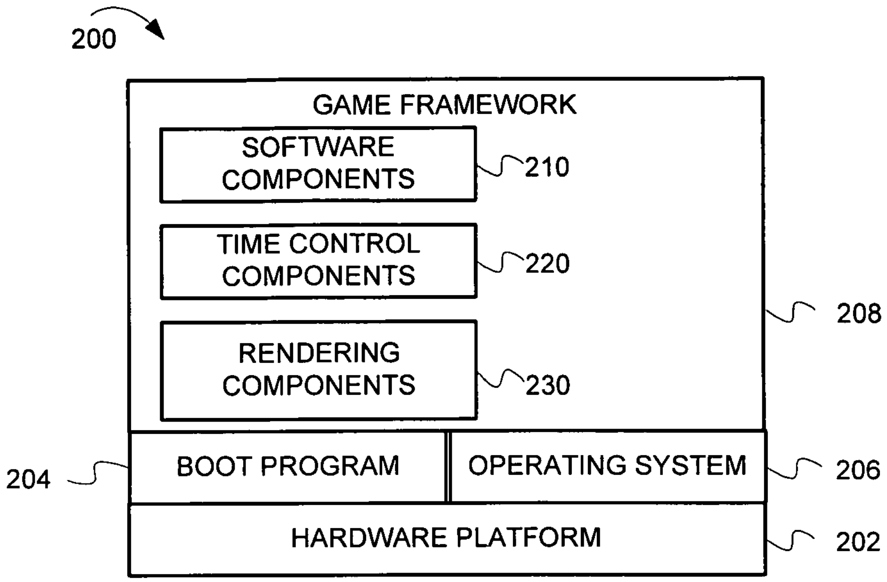
FIG. 2 is a block diagram of a software architecture for a wagering game machine according to an example embodiment.

FIG. 2 is a block diagram of a software architecture 200 for a wagering game machine according to an example embodiment. As shown in FIG. 2, the wagering game architecture includes a hardware platform 202, a boot program 204, an operating system 206, and a game framework 208 that includes one or more wagering game software components 210. In various embodiments, the hardware platform 202 may include a thin-client, thick-client, or some intermediate derivation. The hardware platform 202 may also be configured to provide a virtual client. The boot program 204 may include a basic input/output system (BIOS) or other initialization program that works in conjunction with the operating system 206 to provide a software interface to the hardware platform 202. Operating system 206 may be any operating system, including Linux, UNIX, Mac OS X and Microsoft Windows families of operating systems.

The game framework 208 may include standardized game software components either independent or in combination with specialized or customized game software components that are designed for a particular wagering game. In one example embodiment, the wagering game software components 210 may include software operative in connection with the hardware platform 202 and operating system 206 to present wagering games, such as video poker, video black jack, video slots, video lottery, etc., in whole or part. According to another example embodiment, the software components 210 may include software operative to accept a wager from a player. According to another example embodiment, one or more of the software components 210 may be provided as part of the operating system 206 or other software used in the wagering game system 200 (e.g., libraries, daemons, common services, etc.).

Framework 208 may also include time control components 220. Time components 220 include software modules that provide for controlling time aspects related to presenting a wagering game. For example, time components 220 may include software the controls the rendering of a wagering game or wagering game graphical objects according to differing rates of motion through time. Further details on the operations performed by a time control components 220 are provided below with reference to FIGS. 4-9.

While FIGS. 1 and 2 describe example embodiments of a wagering game machine hardware and software architecture, FIG. 3 shows how a plurality of wagering game machines can be connected in a wagering game network.

FIG. 3 is a block diagram illustrating a wagering game network 300, according to example embodiments of the invention. As shown in FIG. 3, the wagering game network 300 includes a plurality of casinos 312 connected to a communications network 314.

Each of the plurality of casinos 312 includes a local area network 316, which may include a wireless access point 304, wagering game machines 302, and a wagering game server 306 that can serve wagering games over the local area network 316. As such, the local area network 316 includes wireless communication links 310 and wired communication links 308. The wired and wireless communication links can employ any suitable connection technology, such as Bluetooth, 802.11, Ethernet, public switched telephone networks, SONET, etc. In one embodiment, the wagering game server 306 can serve wagering games and/or distribute content to devices located in other casinos 312 or at other locations on the communications network 314.

The wagering game machines 302 and wagering game server 306 can include hardware and machine-readable media including instructions for performing the operations described herein.

The wagering game machines 302 described herein can take any suitable form, such as floor standing models, handheld mobile units, bartop models, workstation-type console models, etc. Further, the wagering game machines 302 can be primarily dedicated for use in conducting wagering games, or can include non-dedicated devices, such as mobile phones, personal digital assistants, personal computers, etc. In one embodiment, the wagering game network 300 can include other network devices, such as accounting servers, wide area progressive servers, player tracking servers, and/or other devices suitable for use in connection with embodiments of the invention.

In various embodiments, wagering game machines 302 and wagering game servers 306 work together such that a wagering game machine 302 may be operated as a thin, thick, or intermediate client. For example, one or more elements of game play may be controlled by the wagering game machine 302 (client) or the wagering game server 306 (server). Game play elements may include executable game code, lookup tables, configuration files, game outcome, audio or visual representations of the game, game assets or the like. In a thin-client example, the wagering game server 306 may perform functions such as determining game outcome or managing assets, while the wagering game machine 302 may be used merely to present the graphical representation of such outcome or asset modification to the user (e.g., player). In a thick-client example, game outcome may be determined locally (e.g., at the wagering game machine 302) and then communicated to the wagering game server 306 for recording or managing a player's account.

Similarly, functionality not directly related to game play may be controlled by the wagering game machine 302 (client) or the wagering game server 306 (server) in embodiments. For example, power conservation controls that manage a display screen's light intensity may be managed centrally (e.g., by the wagering game server 306) or locally (e.g., by the wagering game machine 302). Other functionality not directly related to game play may include presentation of advertising, software or firmware updates, system quality or security checks, etc.

Additionally, a wagering game server 306 or other server may operate with a portable wagering game machine 302 as described below to identify gaming establishment devices that are aimed at or pointed at by the portable wagering game machine. The server may maintain a map of the positions of various gaming establishment devices or locations (e.g. wagering game machines, signs, displays, entrances to theaters, arenas, restaurants, hotel services etc.) that may be used to determine which device or location is pointed at by a portable wagering game machine.

Example Wireless Environment

In some embodiments, the wireless access point 304 can be part of a communication station, such as wireless local area network (WLAN) communication station including a Wireless Fidelity (WiFi) communication station, or a WLAN access point (AP). In these embodiments, the wagering game machines 302 can be part of a mobile station, such as WLAN mobile station or a WiFi mobile station.

In some other embodiments, the wireless access point 304 can be part of a broadband wireless access (BWA) network communication station, such as a Worldwide Interoperability for Microwave Access (WiMax) communication station, as the wireless access point 304 can be part of almost any wireless communication device. In these embodiments, the wagering game machines 302 can be part of a BWA network communication station, such as a WiMax communication station.

In some embodiments, any of the wagering game machines 302 can part of a portable wireless communication device, such as a personal digital assistant (PDA), a laptop or portable computer with wireless communication capability, a web tablet, a wireless telephone, a wireless headset, a pager, an instant messaging device, a digital camera, a television, a medical device (e.g., a heart rate monitor, a blood pressure monitor, etc.), or other device that can receive and/or transmit information wirelessly.

In some embodiments, the wireless access point 304 and the wagering game machines 302 can communicate RF signals in accordance with specific communication standards, such as the Institute of Electrical and Electronics Engineers (IEEE) standards including IEEE 802.11(a), 802.11(b), 802.11(g), 802.11(h) and/or 802.11(n) standards and/or proposed specifications for wireless local area networks, but they can also be suitable to transmit and/or receive communications in accordance with other techniques and standards. In some BWA network embodiments, the wireless access point 304 and the wagering game machines 302 can communicate RF signals in accordance with the IEEE 802.16-2004 and the IEEE 802.16(e) standards for wireless metropolitan area networks (WMANs) including variations and evolutions thereof. However, they can also be suitable to transmit and/or receive communications in accordance with other techniques and standards. For more information with respect to the IEEE 802.11 and IEEE 802.16 standards, please refer to "IEEE Standards for Information Technology—Telecommunications and Information Exchange between Systems" —Local Area Networks—Specific Requirements—Part 11 "Wireless LAN Medium Access Control (MAC) and Physical Layer (PHY), ISO/IEC 8802-11: 1999", and Metropolitan Area Networks—Specific Requirements—Part 16: "Air Interface for Fixed Broadband Wireless Access Systems," Can 2005 and related amendments/versions. In other embodiments, the wireless access point 304 and the wagering game machines 302 can communicate in accordance with a short-range wireless standard, such as the Bluetooth™ short-range digital communication protocol.

It will be appreciated from the above that various components of a wagering game architecture and/or their functionality may be distributed in various manners. For example, all of the components and functionality may reside in a wagering game machine, or various portions may reside in part on a wagering game machine and in part on a server or other network attached device. The scope of the inventive subject matter is meant to include all of these environments.

Figure 4:
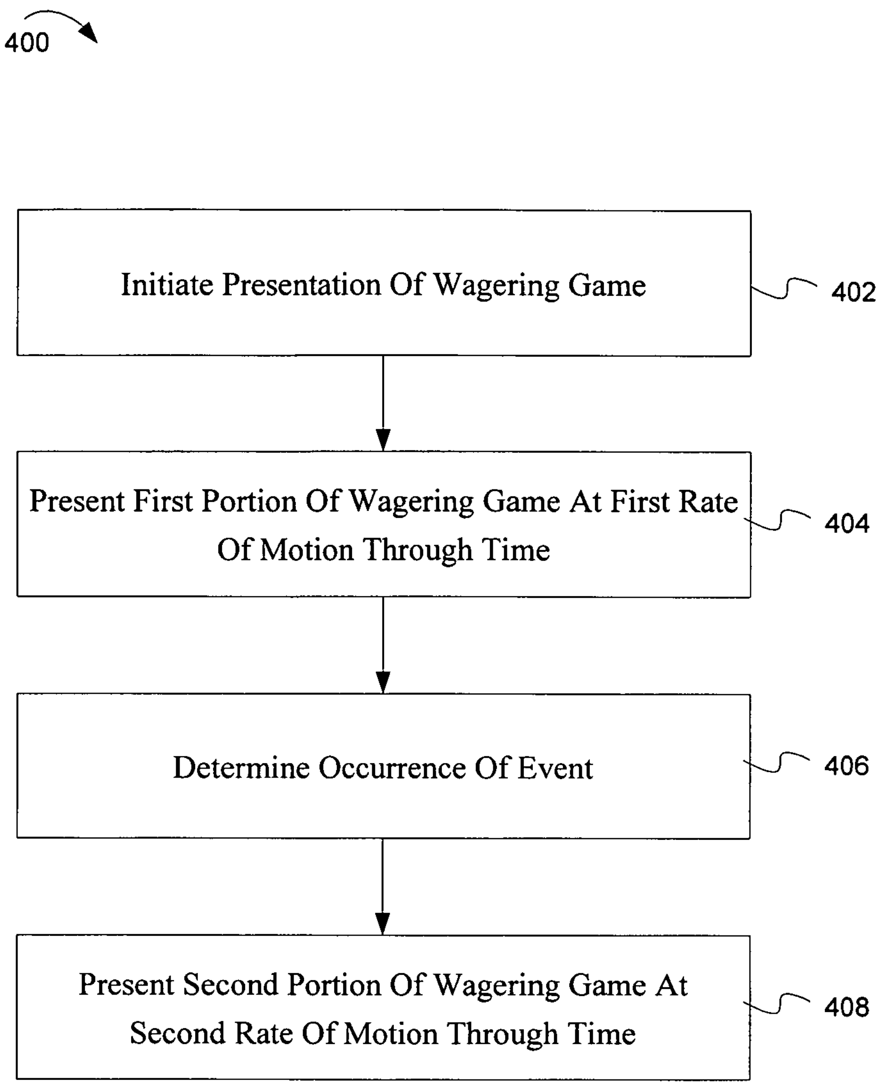
FIG. 4 is a flowchart illustrating methods for providing time control aspects in a wagering game according to example embodiments.

FIG. 4 is a flowchart illustrating a method 400 for providing time control aspects in a wagering game according to example embodiments. The methods to be performed by an operating environment such as control system 100 and network system 300 constitute computer programs made up of computer-executable instructions. Describing the methods by reference to a flowchart enables one skilled in the art to develop such programs including such instructions to carry out the method on suitable processors for gaming machines (the processor or processors of the computer executing the instructions from computer-readable media). The methods illustrated in FIG. 4 are inclusive of acts that may be taken by an operating environment executing an exemplary embodiment of the invention.

In some embodiments, method 400 begins at block 402 by initiating the presentation of a wagering game upon which monetary value may be wagered. The wagering game may be any type of wagering game such as video versions of a slots, poker, keno, bingo, pachinko, craps or any other type of wagering game.

At block 404, a first portion of the wagering game is presented using a first rate of motion through time. For example, in some embodiments the first rate of motion through time may be a standard or real world rate of motion, i.e. the motion of graphical objects representing symbols, reels, dice, balls, roulette wheels, cards, characters, tokens etc. appear to move as they would if they were physical objects moving in the real world.

At block 406, an event occurs that may trigger a change in the manner in which time is handled by the wagering game. The event may comprise any of a variety of different events, and further, a combination of events may be used to trigger a change or enable a change in the way in which graphical objects appear to move in the wagering game. Examples of such events include but are not limited to entry into a bonus round, receiving user input, acquisition of a predetermined number of credits, occurrence of a predetermined number of plays, and/or the passage of a predetermined or randomly determined amount of time.

At block 408, a second portion of the wagering game, or graphical objects display by the wagering game, are presented at a second rate of motion through time that is different from the first rate of motion through time. For example, the second rate of motion through time may be slower (e.g. slow motion) or faster (e.g. fast motion) than the standard or real world rate of motion through time. The second portion of the wagering game may be a continuation of the first portion. For example, the second portion may be a slow motion presentation of the rotation of reels, wheels, or the movement of dice, balls, cards etc. that started of at a standard rate of motion through time. Alternatively, the second portion of the wagering game may be a bonus round or other separate portion of a wagering game.

The rendering of scenes of a wagering game at different rates of motion through time may be controlled by software executed by a processor of a wagering game machine, a graphics processor, a rendering engine, a physics engine, or a combination of the above.

Figure 5A:
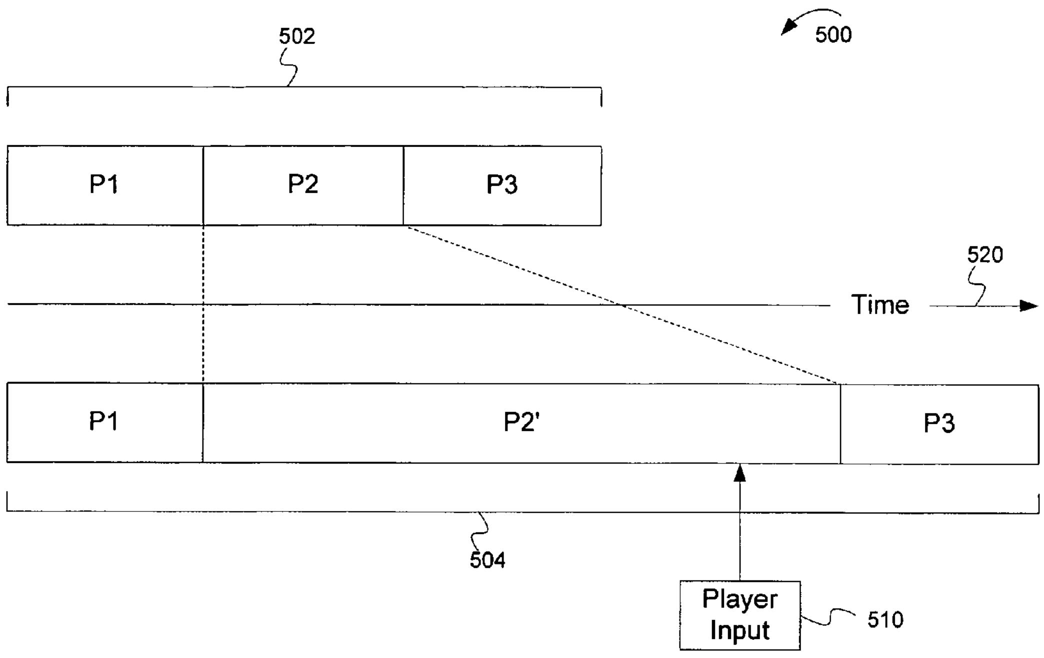
FIGS. 5A and 5B are diagrams illustrating examples of time control aspects of a wagering game utilizing the methods of FIG. 4.
Figure 5B:
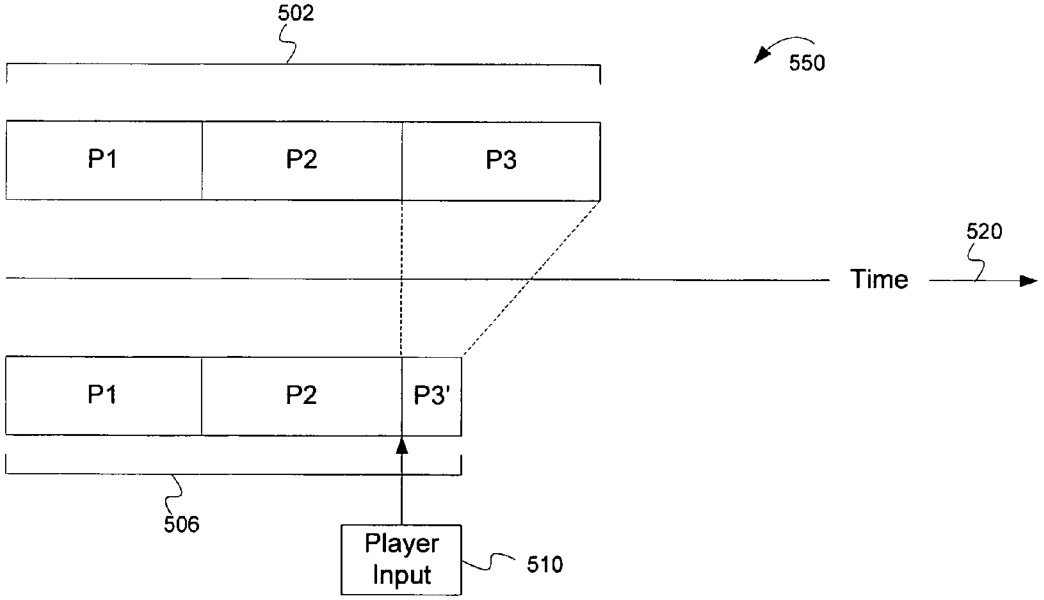

FIGS. 5A and 5B are diagrams illustrating examples of time control aspects of a wagering game utilizing the methods of FIG. 4. In FIG. 5A, an example of a portion of a wagering game presented in slow motion is provided. Timeline 520 represents the flow of time in the real world, and provides a reference time to compare the time control aspects for a wagering game. In the example provided in FIG. 5A, three portions of a wagering game, P1, P2 and P3 are shown. In group 502, the three portions are illustrated as if the three portions P1, P2 and P3 are presented in a rate of motion through time that corresponds with a real world motion through time. In group 504, the rendering and display of portion P2 utilizes a slower rate of motion through time as illustrated by P2'. In other words, P2' represents the same portion of the wagering game as P2, but is rendered and presented in slow motion.

Presenting a portion of a wagering game in slow motion provides opportunities to add interest to a wagering game that may not exist if the same portion were presented in standard or real time. For example, presenting a portion of a wagering game in slow motion may provide opportunities for player input 510 that would not be available or practical if the portion were presented in real time. Player input 510 may comprise a side bet on the outcome of a play of a wagering game. The side bet can input by the current player on a wagering game machine or by another player that is viewing the presentation on the wagering game machine. Player input 510 may be directed to controlling the rate of motion through time, thereby providing a mechanism for a player to control the rate of motion through time. Player input 510 may comprise altering the field of play. For example, the player may add walls, ramps or other object that may be used to alter the path of a die or ball. Further, the player may "wobble" a field of play or roulette wheel. The player input 510 is desirable because it provides a player the illusion of control over the wagering game process and provides a secondary point of interaction with the wagering game.

Additionally, further details may be presented to a player when a portion of a wagering game is presented in slow motion. Details regarding the motion of graphical objects or the interactions between graphical objects may be perceptible at slow motion presentations that would not be perceptible at standard rates of motion through time. For example, movements and collisions of objects with each other and with the boundaries of a play field or objects within the play field may be observed in greater detail than if the portion were presented utilizing a standard rate of motion through time.

The combination of further details being observable in slow motion along with the opportunity to provide player input is also desirable because it provides for improved wagering. For example, a player may realize that a winning combination has already appeared. A wagering game may provide the player an interface to increase their bet during the slow motion presentation of the outcome.

FIG. 5B illustrates an example where the second rate of motion through time is faster than the first rate of motion through time. Again, group 502 includes portions P1, P2 and P3 as they would be presented at a standard rate of motion through time. In this example, group 504 illustrates that portions P1 and P2 are presented at a standard rate of motion through time, while P3' is presented in "fast motion." That is, P3' is the same portion of the wagering game as P3, but rendered and presented at a faster rate of motion through time.

Embodiments providing a "fast motion" capability may provide advantages over previous systems. For example, a player may determine that it is highly unlikely that the current round of play will result in a desirable outcome. An outcome table, hot/cold meter etc. may be displayed to the player and used by the player to determine that a desirable outcome is unlikely. The player may then provide player input 510 to indicate that the current round of play is to be presented at a faster rate of motion through time. The current round of play may then finish earlier, or even immediately, allowing the player to move more quickly to the next round of play. This has advantages for both the player and the gaming establishment. The player does not become bored and is provide more opportunities to play over a given period of time, and the gaming establishment receives more wagering activity from the wagering game.

It should be noted that other properties associated with rendering a wagering game may be changed in addition to the rate of motion through time. In some embodiments the point of view, perspective and/or zoom level may be changed. For example, in a dice based game, the perspective may be changed such that a view of the dice from behind as they move in slow motion may be presented. Further, the zoom level of the dice may be changed such that they appear to be larger as they move in slow motion. Additionally, the field of view may be blurred such that attention is drawn to dice, cards, reels etc. that are moving at slow motion.

Further, properties of the field of play may be altered in addition to changing the rate of motion through time. For example, the field of play, walls within the field of play, balls, dice, reels, reel symbols, cards etc. may be given different properties such that the object appears to have "Nerf®" or superball properties, or appear to be fuzzy, lead lined, watered, or made of Jello®. Changing the physical properties of the objects in the game allows wagering game designers to heighten and exploit the most exciting parts of wagering games. For example if bouncing dice are exciting, rubber dice that bounce extra high can be even more exciting.

Still further, objects or aspects may be introduced into the field of play, either under the control of the wagering game or under the control of a player through player input 510. For example, walls, ramps, bumpers or other objects may be introduced onto the field of play, or a "black hole" aspect may be added to the field of play.

Figure 6:
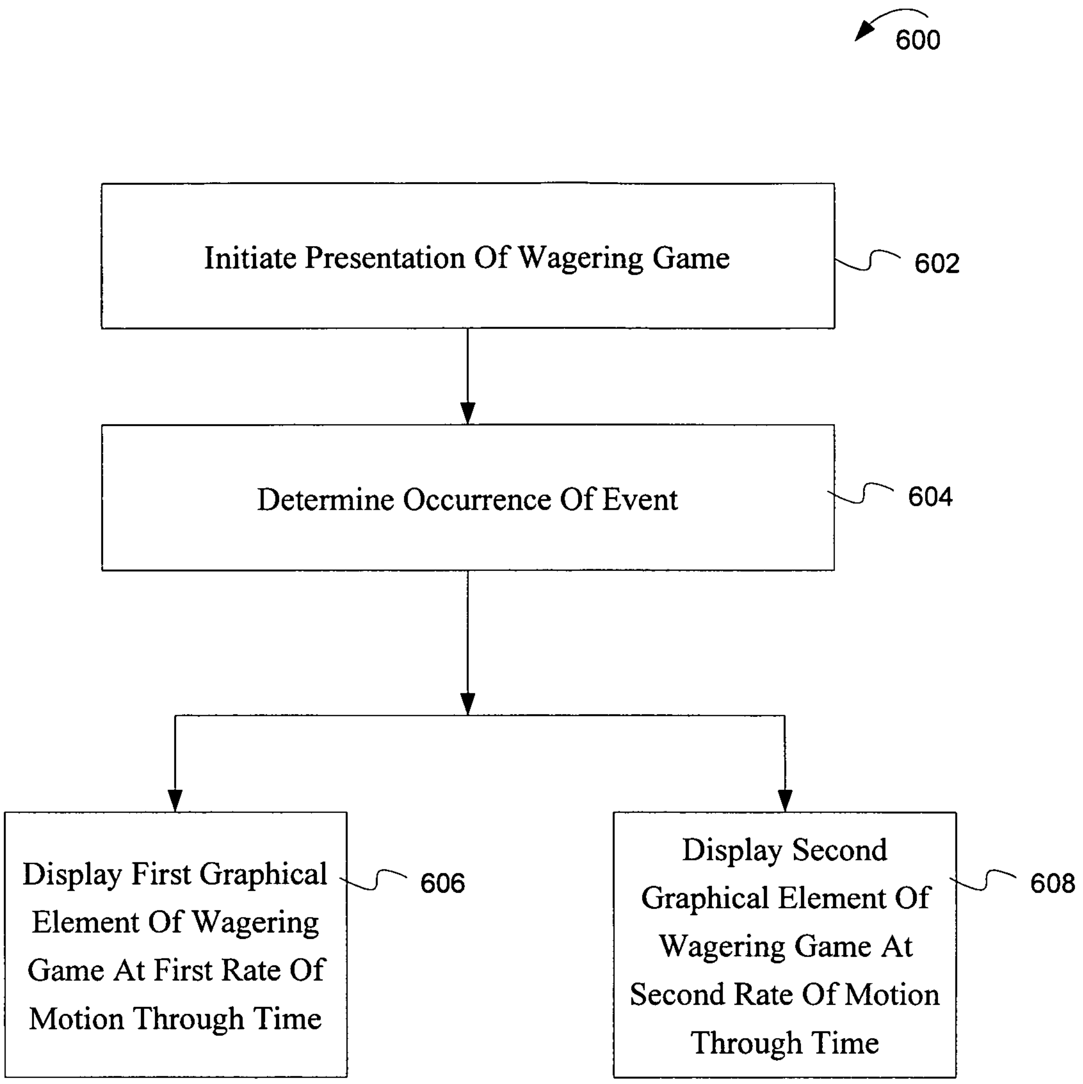
FIG. 6 is a flowchart illustrating methods for providing time control aspects in a wagering game according to alternative example embodiments.

FIG. 6 is a flowchart illustrating a method 600 for providing time control aspects in a wagering game according to alternative example embodiments. In some embodiments, method 600 begins at block 602 by initiating the presentation of a wagering game upon which monetary value may be wagered. The wagering game may be any type of wagering game such as video versions of a slots, poker, keno, bingo, pachinko, craps or any other type of wagering game.

At block 604, an event occurs that may trigger a change in the manner in which time is handled by the wagering game. The event may comprise any of a variety of different events, and further, a combination of events may be used to trigger a change or enable a change in the way in which graphical objects appear to move in the wagering game. Examples of such events include but are not limited to entry into a bonus round, receiving user input, acquisition of a predetermined number of credits, occurrence of a predetermined number of plays, and/or the passage of a predetermined or randomly determined amount of time.

Blocks 606 and 608 are shown at the same level in the flow chart because they represent actions that may take place at the same time as perceived by a user or player.

At block 606, a first graphical element or object of a wagering game is presented using a first rate of motion through time. For example, in some embodiments the first rate of motion through time may be a standard or real world rate of motion. Thus the motion of a graphical object representing a symbol, reel, die, ball, roulette wheel, card, character, token, clock etc. appears to move in the same manner as the object would move if the object was a physical object moving in the real world.

At block 608, a second graphical element or object of a wagering game is presented using a second rate of motion through time that is different from the first rate. The second graphical object may be the same type of object as the first graphical object or it may be a different type of object. Thus during the display of a wagering game incorporating method 600, different objects that are displayed simultaneously may appear to move at different rates of motion through time.

Various wagering game embodiments utilizing method 600 are possible. For example, in a roulette style wagering game, a roulette wheel may spin in standard or real time while the roulette ball moves in slow motion (or vice versa). In a wagering game having characters or tokens (e.g., a bonus round of a wagering game), some characters or tokens may move at standard rates, some may move in slow motion, and other may move in fast motion. Further, clocks may be displayed as moving at different rates of motion through time. For example, a game clock may move in real time, while an eligibility clock for a community based game may move at different rates (slow motion or fast motion). The rate of motion for the eligibility clock may be based on any of a number of factors, including the number of players currently eligible or the size of the available jackpot.

Similarly, in a community based game, characters or tokens representing each player in the community game may be rendered such that they appear to move at different rates, some in slow motion, some in fast motion, and others at a standard or real motion through time.

Figure 7:
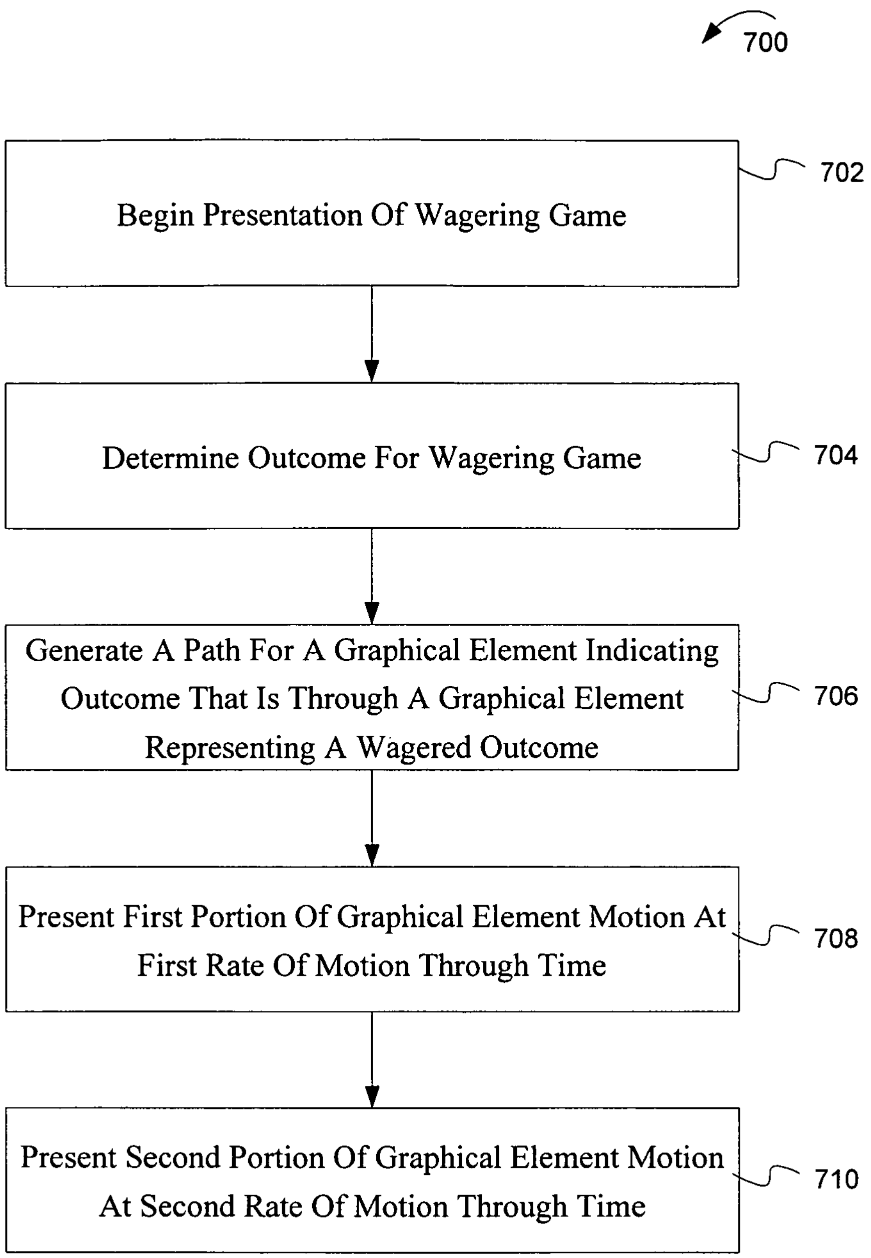
FIG. 7 is a flowchart illustrating methods for providing time control aspects in a wagering game according to further example embodiments.

FIG. 7 is a flowchart illustrating method a method 700 for providing time control aspects in a wagering game according to further example embodiments. In some embodiments, method 700 begins at block 702 by initiating the presentation of a wagering game upon which monetary value may be wagered. The wagering game may be any type of wagering game such as video versions of a slots, poker, keno, bingo, pachinko, craps or any other type of wagering game.

At block 704, an outcome for the wagering game is determined. As noted above, the outcome is typically generated using a random number generator and is generated in response to a wager initiated on the wagering game machine by a player. The outcome that is desired by the player will be referred to as the wagered outcome and the outcome actually generated by the wagering game machine will be referred to as the generated outcome.

At block 706 the wagering game generates a path for a graphical object or objects used to indicate the outcome. As an example, a graphical object used to indicate an outcome in roulette style game is a roulette ball. Dice, cards, reel symbols are other graphical objects that may be used to indicate an outcome of a wagering game machine. From a player's point of view, the path of an object starts when the object begins motion, or enters a field of play (e.g., the reels spin, the roulette ball and roulette wheel spin, dice are thrown, cards are dealt etc.) and the path ends when the graphical object or objects stop at the generated outcome (e.g., the reels stop spinning, the roulette ball stops at a position on the roulette wheel, the dice stop rolling etc.). In some embodiments, the wagering game generates a path that goes through or near the wagered outcome and ends with the generated outcome. Thus the wagering game determines how the graphical object must enter the field otherwise begin motion in order to pass through or near the wagered outcome to end at the generated outcome. In some embodiments, the path is reverse mapped, that is, generated in the reverse direction where the wagering game starts at a symbol or position representing the generated outcome, determines a path near or through a symbol representing the wagered outcome, and then determines a path to a starting position. Various path finding heuristics may be used to generate such a path, including heuristics based on velocity curves and percolation theory. Further, AI (Artificial Intelligence) methodologies may be used to generate a path.

At block 708, a first portion of the graphical object or objects movement along the path is presented using a first rate of motion through time. For example, a ball, dice, cards etc. may be rendered and displayed such that the object or objects appear to move at a standard rate of motion through time.

At block 710, a second portion of the graphical object or objects movement along the path is displayed at a second rate of motion through time. For example, as the graphical object or objects nears or passes through the wagered outcome, the rate of motion through time may be slowed. This may generate a feeling of anticipation or excitement as the player senses the possibility of a winning outcome.

As the graphical object passes through the wagered outcome and on to the generated outcome, the rate of motion through time may continue at the second (e.g. slower) rate, or it may be returned to the first rate of motion through time.

Additionally, different elements of the wagering game may be taken out of slow motion at different points. For example, in a roulette game the wheel and the ball may both be rendered in slow motion. A player interaction bumps the wheel, returning it to regular motion through time. Then, at a later time (e.g., 1-3 seconds later), the ball returns to regular time. Where there is only one object, the different forces on the object may be brought into play at different times. Thrown dice, for example, may have their motion through space speed up before the spin speeds up. This allows a game designer to further 'baffle' player interaction, and mute the player's ability to control a wagering game or bonus game so that the outcome remains randomly determined even though the illusion of control has been provided to the player.

Figure 8:
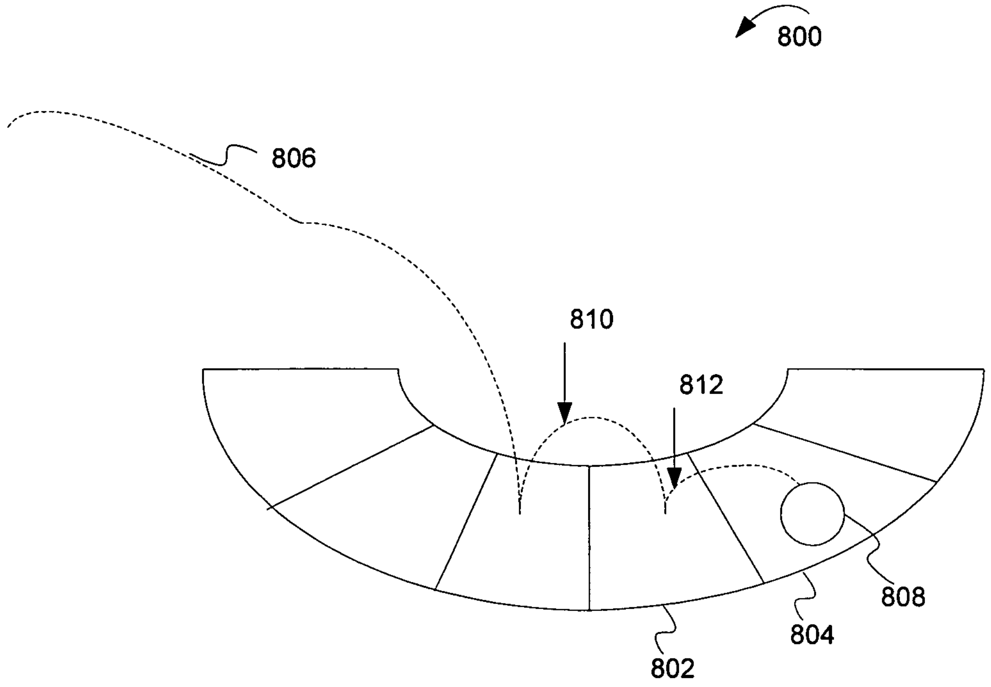
FIG. 8 is a diagram illustrating an example of time control aspects of a wagering game utilizing the method of FIG. 7.

FIG. 8 is a diagram illustrating an example 800 of time control aspects of a wagering game utilizing the method of FIG. 7. A roulette embodiment is illustrated in FIG. 8. As is typical with roulette style games, a roulette wheel has number positions around the wheel. A section of a roulette wheel is provided in FIG. 8. In the example shown, position 802 represents a wagered outcome (i.e., the outcome a player has wagered will occur) and position 804 represents a generated outcome (i.e., the actual winning outcome). Ball 808 follows path 806 to the generated outcome. Path 806 has been generated as described above in FIG. 7. From the start of path 806 to position 810 in the path, the ball 808 may appear to move in standard or real time. However, at position 810 (i.e. as the ball nears wagered outcome 802), the wagering game display may be rendered such that the ball and roulette wheel appear to move in slow motion. As the ball passes past the wagered outcome at position 812, the wagering game may render the display such that the ball and roulette wheel return to a standard or real motion through time.

While a roulette example has been provided in FIG. 8, it will be appreciated that the method illustrated in FIG. 8 is applicable to other styles of wagering games. Other ball based games may be used, for instance in a pachinko style game. In dice based games, the dice may be rendered in slow motion as the faces of the dice move towards a wagered outcome. In card based games, the cards may be revealed in slow motion when the cards are close to representing the wagered outcome. In reel based games, the reels may be rendered in slow motion when the symbols approach the wagered outcome. The methods described above are not limited to any particular type of wagering game.

Figure 9:
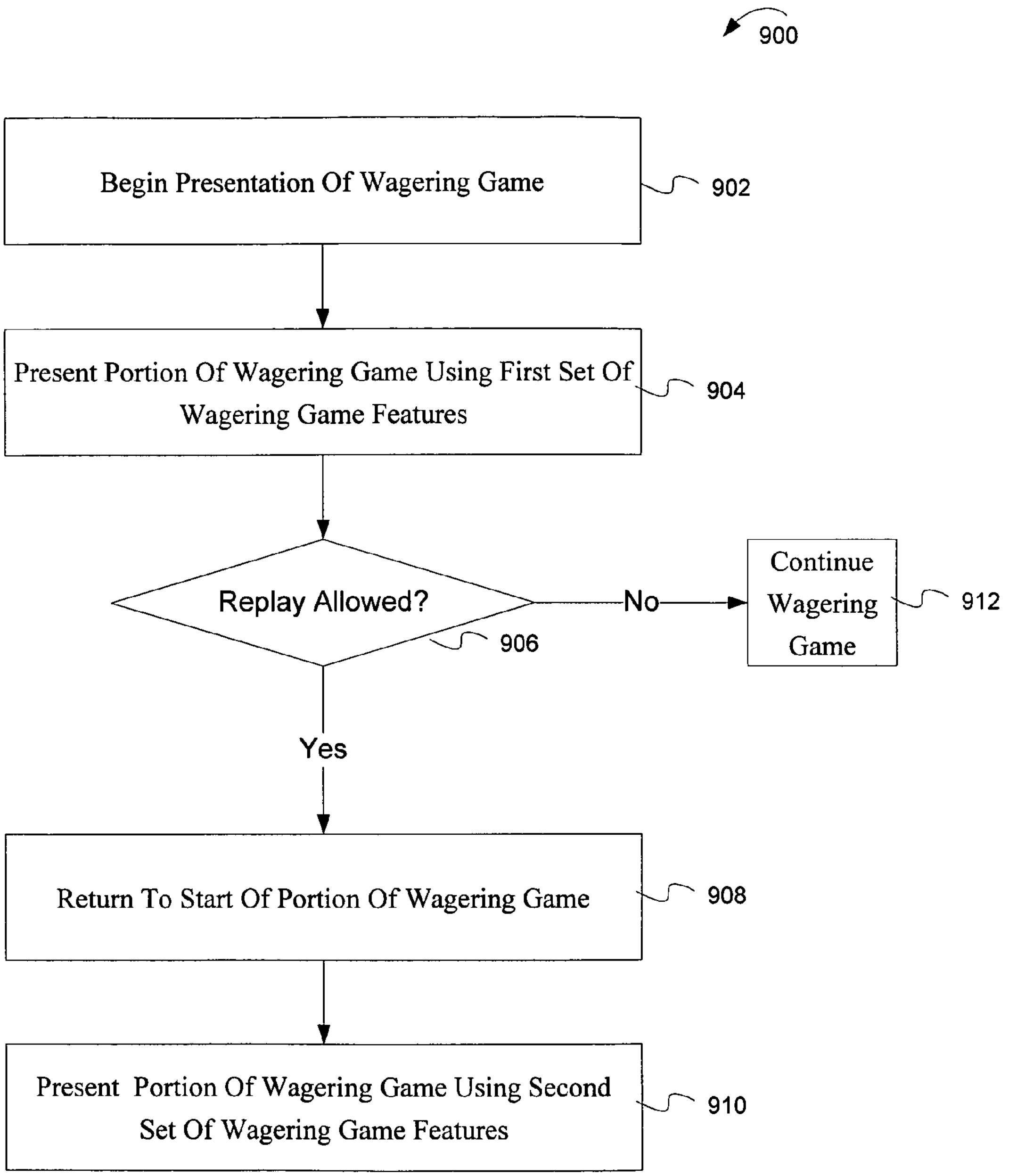
FIG. 9 is a flowchart illustrating methods for providing time control aspects in a wagering game according to still further example embodiments.

FIG. 9 is a flowchart illustrating a method 900 for providing time control aspects involving replaying a portion of a wagering game according to still further example embodiments. In some embodiments, method 900 begins at block 902 by initiating the presentation of a wagering game upon which monetary value may be wagered. The wagering game may be any type of wagering game such as video versions of a slots, poker, keno, bingo, pachinko, craps or any other type of wagering game.

At block 904, a portion of the wagering game is presented using a first set of wagering game features. The wagering game features may relate to characteristics such as bonus multipliers present, the size of the field of play, or any other wagering game characteristic. The portion may be a portion of a wagering game or it may be a bonus round or portion of a bonus round.

After the portion has been presented, at block 906 the wagering game determines if a replay is allowed. Various conditions may control whether a replay is allowed. For example, a player may have had to accumulate a certain number of credits, completed a certain number of bonus rounds or episodes or attained a particular frequent player status. In some embodiments, a replay may be allowed at randomly generated times. For example, a replay may be allowed upon the occurrence of a particular symbol in the wagering game.

If a replay is not allowed, the wagering game continues at block 912.

If a replay is allowed, at block 908 the wagering game returns to the start of the portion of the wagering game previously played. In some embodiments, the wagering game appears to "jump" back to the start of the portion to be replayed. In alternative embodiments, the wagering game appears to move backward from the end of the portion to the beginning of the portion, i.e., the wagering game appears to rewind to the beginning of the portion.

At block 910, the portion of the wagering game is presented using a second set of wagering features, where at least some of the features are different from features in the first set. For example, during the second play, the bonus multipliers may be changed; the size of the field of play may be increased or decreased.

It should be noted that more than one player may be allowed to replay a portion of a wagering game and that a different outcome may be generated instead of, or in addition to the different features provided during the replay. For example, in a craps style wagering game, a first player (the "shooter") may have an undesirable outcome. A second player may initiate a replay in order to give the shooter a chance at a better outcome.

As can be seen from the above examples, allowing a replay of a portion of a wagering game increases excitement, because it provides the opportunity for a player to increase winnings.

Example Wagering Game Machine

Figure 10:
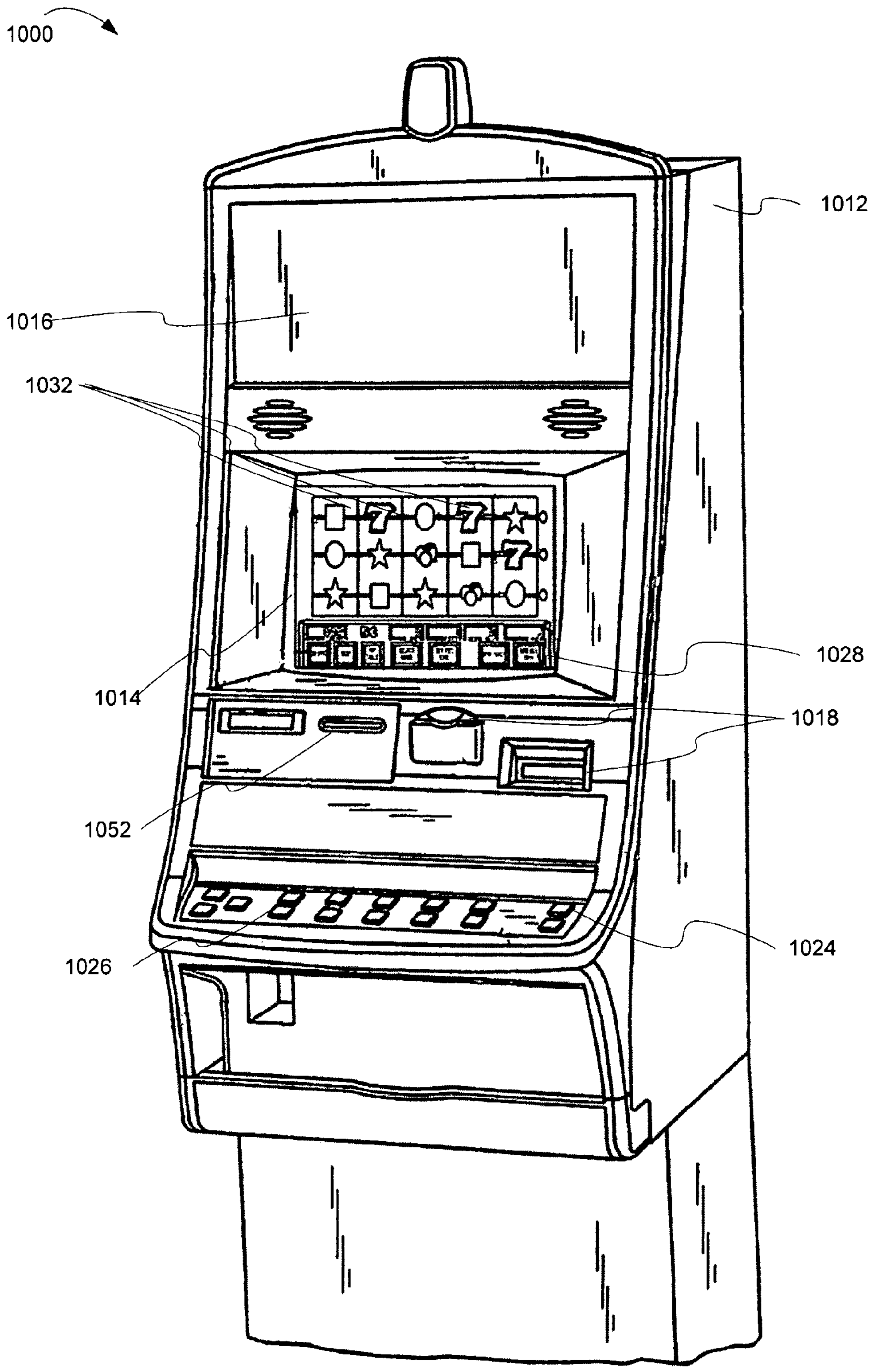
FIG. 10 is a perspective view of a wagering game machine, according to example embodiments of the invention.

FIG. 10 is a perspective view of a wagering game machine, according to example embodiments of the invention. Referring to FIG. 10, a wagering game machine 1000 is used in gaming establishments, such as casinos. According to embodiments, the wagering game machine 1000 can be any type of wagering game machine and can have varying structures and methods of operation. For example, the wagering game machine 1000 can be an electromechanical wagering game machine configured to play mechanical slots, or it can be an electronic wagering game machine configured to play video casino games, such as blackjack, slots, keno, poker, blackjack, roulette, etc.

The wagering game machine 1000 comprises a housing 1012 and includes input devices, including value input devices 1018 and a player input device 1024. For output, the wagering game machine 1000 includes a primary display 1014 for displaying information about a basic wagering game. The primary display 1014 can also display information about a bonus wagering game and a progressive wagering game. The wagering game machine 1000 also includes a secondary display 1016 for displaying wagering game events, wagering game outcomes, and/or signage information. While some components of the wagering game machine 1000 are described herein, numerous other elements can exist and can be used in any number or combination to create varying forms of the wagering game machine 1000.

The value input devices 1018 can take any suitable form and can be located on the front of the housing 1012. The value input devices 1018 can receive currency and/or credits inserted by a player. The value input devices 1018 can include coin acceptors for receiving coin currency and bill acceptors for receiving paper currency. Furthermore, the value input devices 1018 can include ticket readers or barcode scanners for reading information stored on vouchers, cards, or other tangible portable storage devices. The vouchers or cards can authorize access to central accounts, which can transfer money to the wagering game machine 1000.

The player input device 1024 comprises a plurality of push buttons on a button panel 1026 for operating the wagering game machine 1000. In addition, or alternatively, the player input device 1024 can comprise a touch screen 1028 mounted over the primary display 1014 and/or secondary display 1016.

The various components of the wagering game machine 1000 can be connected directly to, or contained within, the housing 1012. Alternatively, some of the wagering game machine's components can be located outside of the housing 1012, while being communicatively coupled with the wagering game machine 1000 using any suitable wired or wireless communication technology.

The operation of the basic wagering game can be displayed to the player on the primary display 1014. The primary display 1014 can also display a bonus game associated with the basic wagering game. The primary display 1014 can include a cathode ray tube (CRT), a high resolution liquid crystal display (LCD), a plasma display, light emitting diodes (LEDs), or any other type of display suitable for use in the wagering game machine 1000. Alternatively, the primary display 1014 can include a number of mechanical reels to display the outcome. In FIG. 10, the wagering game machine 1000 is an "upright" version in which the primary display 1014 is oriented vertically relative to the player. Alternatively, the wagering game machine can be a "slant-top" version in which the primary display 1014 is slanted at about a thirty-degree angle toward the player of the wagering game machine 1000. In yet another embodiment, the wagering game machine 1000 can exhibit any suitable form factor, such as a free standing model, bartop model, mobile handheld model, or workstation console model. Further, in some embodiments, the wagering game machine 1000 may be include an attached chair assembly, and may include audio speakers designed to provide an enhanced audio environment. For example, a "surround sound" system may be included as part of the wagering game machine and may be integrated with the attached chair.

A player begins playing a basic wagering game by making a wager via the value input device 1018. The player can initiate play by using the player input device's buttons or touch screen 1028. The basic game can include arranging a plurality of symbols along a payline 1032, which indicates one or more outcomes of the basic game. Such outcomes can be randomly selected in response to player input. At least one of the outcomes, which can include any variation or combination of symbols, can trigger a bonus game.

In some embodiments, the wagering game machine 1000 can also include an information reader 1052, which can include a card reader, ticket reader, bar code scanner, RFID transceiver, or computer readable storage medium interface. In some embodiments, the information reader 1052 can be used to award complimentary services, restore game assets, track player habits, etc.

Example Portable Wagering Game Machine

Figure 11:
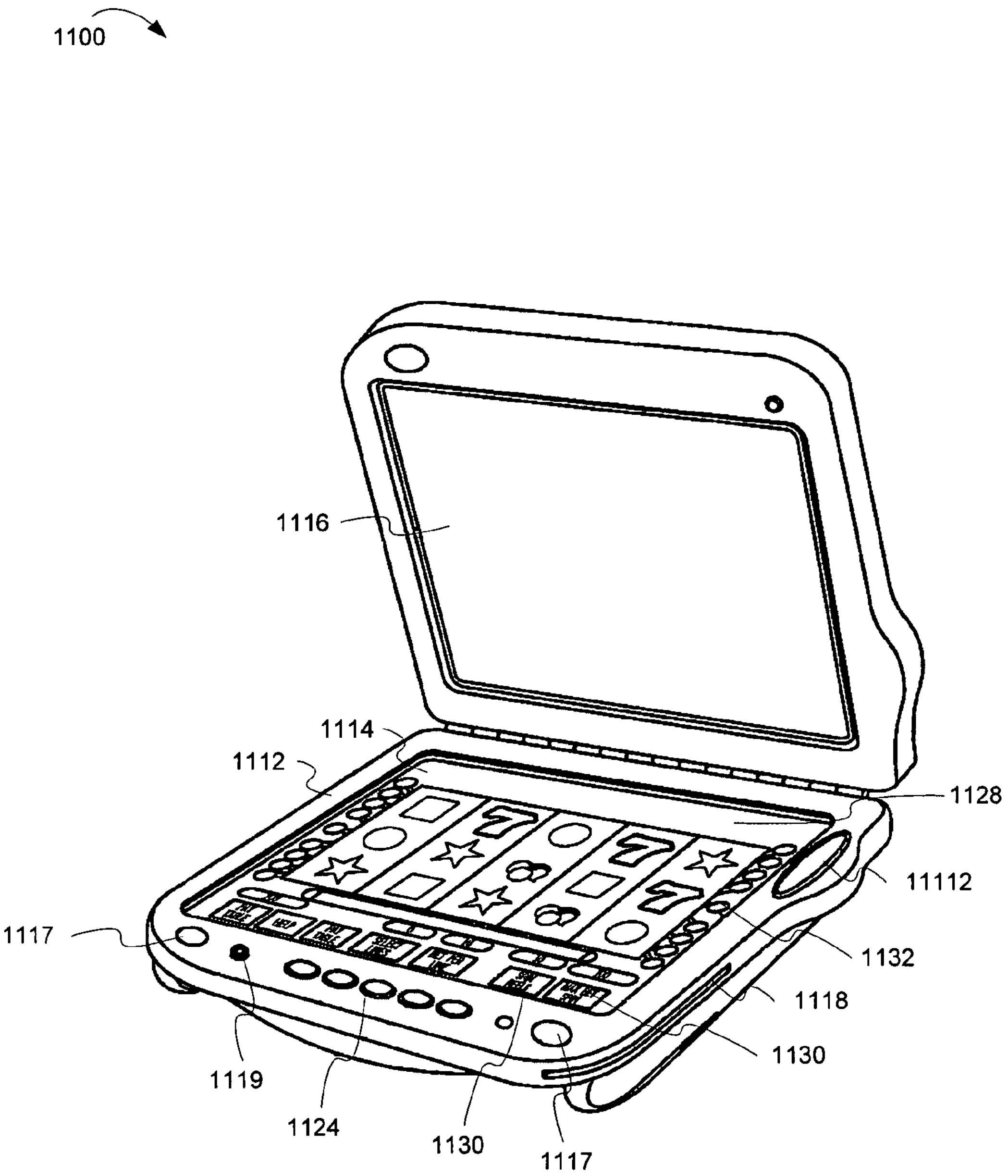
FIG. 11 is a perspective view of a portable wagering game machine according to an example embodiment.

FIG. 11 shows an example embodiment of a portable wagering game machine 1100. The portable wagering game machine 1100 can include any suitable electronic handheld or mobile device configured to play a video casino game such as blackjack, slots, keno, poker, blackjack, and roulette. The wagering game machine 1100 comprises a housing 1112 and includes input devices, including a value input device 1118 and a player input device 1124. For output, the wagering game machine 1100 includes a primary display 1114, and may include a secondary display 1116, one or more speakers 1117, one or more player-accessible ports 1119 (e.g., an audio output jack for headphones, a video headset jack, etc.), and other conventional I/O devices and ports, which may or may not be player-accessible. In the embodiment depicted in FIG. 11, the wagering game machine 1100 includes a secondary display 1116 that is rotatable relative to the primary display 1114. The optional secondary display 1116 can be fixed, movable, and/or detachable/attachable relative to the primary display 1114. Either the primary display 1114 and/or secondary display 1116 can be configured to display any aspect of a non-wagering game, wagering game, secondary game, bonus game, progressive wagering game, group game, shared-experience game or event, game event, game outcome, scrolling information, text messaging, emails, alerts or announcements, broadcast information, subscription information, and wagering game machine status.

The player-accessible value input device 1118 can comprise, for example, a slot located on the front, side, or top of the casing 1112 configured to receive credit from a stored-value card (e.g., casino card, smart card, debit card, credit card, etc.) inserted by a player. The player-accessible value input device 1118 can also comprise a sensor (e.g., an RF sensor) configured to sense a signal (e.g., an RF signal) output by a transmitter (e.g., an RF transmitter) carried by a player. The player-accessible value input device 1118 can also or alternatively include a ticket reader, or barcode scanner, for reading information stored on a credit ticket, a card, or other tangible portable credit or funds storage device. The credit ticket or card can also authorize access to a central account, which can transfer monetary value to the wagering game machine 1100.

Still other player-accessible value input devices 1118 can require the use of touch keys 1130 on the touch-screen display (e.g., primary display 1114 and/or secondary display 1116) or player input devices 1124. Upon entry of player identification information and, preferably, secondary authorization information (e.g., a password, PIN number, stored value card number, predefined key sequences, etc.), the player can be permitted to access a player's account. As one potential optional security feature, the wagering game machine 1100 can be configured to permit a player to only access an account the player has specifically set up for the wagering game machine 1100. Other conventional security features can also be utilized to, for example, prevent unauthorized access to a player's account, to minimize an impact of any unauthorized access to a player's account, or to prevent unauthorized access to any personal information or funds temporarily stored on the wagering game machine 1100.

The player-accessible value input device 1118 can itself comprise or utilize a biometric player information reader which permits the player to access available funds on a player's account, either alone or in combination with another of the aforementioned player-accessible value input devices 1118. In an embodiment wherein the player-accessible value input device 1118 comprises a biometric player information reader, transactions such as an input of value to the wagering game machine 1110, a transfer of value from one player account or source to an account associated with the wagering game machine 1100, or the execution of another transaction, for example, could all be authorized by a biometric reading, which could comprise a plurality of biometric readings, from the biometric device.

Alternatively, to enhance security, a transaction can be optionally enabled only by a two-step process in which a secondary source confirms the identity indicated by a primary source. For example, a player-accessible value input device 1118 comprising a biometric player information reader can require a confirmatory entry from another biometric player information reader 1152, or from another source, such as a credit card, debit card, player ID card, fob key, PIN number, password, hotel room key, etc. Thus, a transaction can be enabled by, for example, a combination of the personal identification input (e.g., biometric input) with a secret PIN number, or a combination of a biometric input with an authentication fob input, or a combination of a fob input with a PIN number, or a combination of a credit card input with a biometric input. Essentially, any two independent sources of identity, one of which is secure or personal to the player (e.g., biometric readings, PIN number, password, etc.) could be utilized to provide enhanced security prior to the electronic transfer of any funds. In another aspect, the value input device 1118 can be provided remotely from the wagering game machine 1110.

The player input device 1124 may include a plurality of push buttons on a button panel for operating the wagering game machine 1100. In addition, or alternatively, the player input device 1124 can comprise a touch screen mounted to the primary display 1114 and/or secondary display 1116. In one aspect, the touch screen is matched to a display screen having one or more selectable touch keys 1130 selectable by a user's touching of the associated area of the screen using a finger or a tool, such as a stylus pointer. A player enables a desired function either by touching the touch screen at an appropriate touch key 1130 or by pressing an appropriate push button on the button panel. The touch keys 1130 can be used to implement the same functions as push buttons. Alternatively, the push buttons 1126 can provide inputs for one aspect of the operating the game, while the touch keys 1130 can allow for input needed for another aspect of the game. The various components of the wagering game machine 1100 can be connected directly to, or contained within, the casing 1112, as seen in FIG. 11, or can be located outside the casing 1112 and connected to the casing 1112 via a variety of wired (tethered) or wireless connection methods. Thus, the wagering game machine 1100 can comprise a single unit or a plurality of interconnected (e.g., wireless connections) parts which can be arranged to suit a player's preferences.

The operation of the basic wagering game on the wagering game machine 1100 is displayed to the player on the primary display 1114. The primary display 1114 can also display a bonus game associated with the basic wagering game. The primary display 1114 preferably takes the form of a high resolution LCD, a plasma display, an LED, or any other type of display suitable for use in the wagering game machine 1100. The size of the primary display 1114 can vary from, for example, about a 11-3" display to a 15" or 17" display. In at least some embodiments, the primary display 1114 is a 7"-10" display. In one embodiment, the size of the primary display can be increased. Optionally, coatings or removable films or sheets can be applied to the display to provide desired characteristics (e.g., anti-scratch, anti-glare, bacterially-resistant and anti-microbial films, etc.). In at least some embodiments, the primary display 1114 and/or secondary display 1116 can have a 16:9 aspect ratio or other aspect ratio (e.g., 4:3). The primary display 1114 and/or secondary display 1116 can also each have different resolutions, different color schemes, and different aspect ratios.

A player typically begins play of the basic wagering game on the wagering game machine 1100 by making a wager (e.g., via the value input device 1118 or an assignment of credits stored on the portable wagering game machine 1100 via the touch screen keys 1130, player input device 1124, or buttons 1126) on the wagering game machine 1100. In some embodiments, the basic game can comprise a plurality of symbols arranged in an array, and includes at least one payline 1132 that indicates one or more outcomes of the basic game. Such outcomes can be randomly selected in response to the wagering input by the player. At least one of the plurality of randomly selected outcomes can be a start-bonus outcome, which can include any variations of symbols or symbol combinations triggering a bonus game.

In some embodiments, the player-accessible value input device 1118 of the wagering game machine 1100 can double as a player information reader 1152 that allows for identification of a player by reading a card with information indicating the player's identity (e.g., reading a player's credit card, player ID card, smart card, etc.). The player information reader 1152 can alternatively or also comprise a bar code scanner, RFID transceiver or computer readable storage medium interface. In one embodiment, the player information reader 1152 comprises a biometric sensing device.

In some embodiments, a portable wagering game machine 1100 can part of a portable wireless communication device, such as a personal digital assistant (PDA), a laptop or portable computer with wireless communication capability, a web tablet, a wireless telephone, a wireless headset, a pager, an instant messaging device, a digital camera, a television, or other device that can receive and/or transmit information wirelessly.

CONCLUSION

Systems and methods for presenting a wagering game in which a portion or elements of the wagering game move through time at different rates than other portions or elements of the wagering game have been described. Various desirable effects can be achieved by various embodiments. For example, a sense of excitement and anticipation may be created through by changing the rate of motion through time for a wagering game. Further, additional opportunities to provide input or see wagering game progress in detail may be provided. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the inventive subject matter.

The terminology used in this application is meant to include all of these environments. It is to be understood that the above description is intended to be illustrative, and not restrictive. Many other embodiments will be apparent to those of skill in the art upon reviewing the above description. Therefore, it is manifestly intended that this invention be limited only by the following claims and equivalents thereof.

The Abstract is provided to comply with 37 C.F.R. §1.72(b) to allow the reader to quickly ascertain the nature and gist of the technical disclosure. The Abstract is submitted with the understanding that it will not be used to limit the scope of the claims.

What is claimed is:

1. A method for execution by one or more processors, the method comprising:

presenting by the one or more processors a wagering game upon which monetary value may be wagered, the wagering game including a graphical object in a field of play;

displaying, on a display device, the graphical object according to a first rate of motion through time from a first perspective;

in response to a triggering event in the wagering game, displaying, on the display device, the graphical object according to a second rate of motion through time from a second perspective and altering properties of the field of play, the second perspective being different than the first perspective, the second rate of motion through time being slower than the first rate of motion through time; and after displaying the graphical object according to the second rate of motion through time, returning to displaying, on the display device, the graphical object according to the first rate of motion through time.

2. The method of claim 1, further comprising displaying additional graphical detail for the graphical object in response to the triggering event.

3. The method of claim 2, wherein the triggering event comprises a bonus round, the occurrence of a symbol, or earning credits that exceed a predetermined threshold.

4. The method of claim 1, further comprising displaying the graphical object in accordance with a changed set of view characteristics in response to the triggering event.

5. The method of claim 4, wherein the set of view characteristics include perspective, position or zoom level.

6. The method of claim 1, further including generating by the one or more processors an outcome of the wagering game and a path of the graphical object to the generated outcome, wherein the displaying the graphical object according to the first rate of motion through time occurs with respect to the graphical object's initial movement along the path, wherein the displaying the graphical object according to the second rate of motion through time occurs with respect to the graphical object's further movement along the path proximate a player's desired outcome, and wherein the returning to displaying the graphical object according to the first rate of motion through time occurs with respect to the graphical object's final movement along the path to the generated outcome.

7. The method of claim 6, wherein the graphical object's final movement along the path passes through the player's desired outcome.

8. A method for execution by one or more processors, the method comprising:

presenting by the one or more processors a wagering game upon which monetary value may be wagered, the wagering game including a graphical object in a field of play;

presenting, on a display device, a portion of the wagering game including the graphical object from a first perspective according to a first rate of motion through time in accordance with a first set of one or more wagering game features;

in response to a triggering event in the wagering game, returning to a previous point in time of the portion of the wagering game;

presenting, on the display device, the portion of the wagering game according to a second rate of motion through time, from a second perspective different from the first perspective and altering properties of the field of play, in accordance with a second set of one or more wagering game features, the presenting starting at the previous point in time; and after displaying the portion of the wagering game according to the second rate of motion through time from the second perspective, returning to presenting, on the display device, the portion of the wagering game according to the first rate of motion through time from the first perspective.

9. The method of claim 8, further comprising receiving a selection of the point in time through a user interface.

10. The method of claim 8, wherein the point in time is predetermined.

11. The method of claim 8, wherein returning to the point in time includes displaying the first portion of the wagering game backwards in time to the point in time.

12. An apparatus comprising:

a wagering game component operable to present a wagering game upon which monetary value may be wagered on a display device, the wagering game including graphical objects in a field of play;

a time control component operable to determine the rate of motion through time at which the graphical objects are presented by the wagering game component; and a rendering component operable to render the graphical objects from a first perspective and a second perspective, the second perspective being different from the first perspective and altering properties of the field of play, in accordance with the rate of motion through time;

wherein the time control component determines a first rate of motion through time for a first portion of the wagering game and, in response to a triggering event in the wagering game, the time control component determines a second rate of motion through time for a second portion of the wagering game, the second rate of motion through time being slower than the first rate of motion through time; and the rendering component renders the graphical objects according to the first rate of motion through time during the first portion and the second rate of motion through the second portion.

13. The apparatus of claim 12, wherein the time control component determines a first rate of motion through time for a first graphical object and a second rate of motion through time for a second graphical object, and wherein the first graphical object and the second graphical object are rendered such that they are displayed simultaneously.

14. The method of claim 13, wherein the triggering event comprises the first graphical object nearing a wagered outcome, and the displaying the second graphical object includes depicting the second graphical object passing through the wagered outcome.

15. A machine-readable medium having machine executable instructions stored thereon that when executed, cause one or more processors to execute a method, the method comprising:

presenting, on a display device, a wagering game upon which monetary value may be wagered, the wagering game including a graphical object in a field of play;

presenting, on the display device, a first portion of the wagering game including the graphical object from a first perspective in accordance with a first rate of motion through time;

presenting, on the display device, in response to a triggering event in the wagering game, a second portion of the wagering game, depicting the first portion of the wagering game and the graphical object from a second perspective that is different from the first perspective and alters the field of play, in accordance with a second rate of motion through time, the second rate of motion through time being slower than the first rate of motion through time; and after presenting the graphical object according to the second rate of motion through time, returning to presenting, on the display device, the graphical object according to the first rate of motion through time.

16. The machine-readable medium of claim 15, wherein the method further comprises receiving input through a user interface during the second portion of the wagering game, wherein the input provides the triggering event.

17. The machine-readable medium of claim 15, wherein the method further comprises displaying additional graphical detail of the graphical object during the second portion of the wagering game.

18. The machine-readable medium of claim 15, wherein the second portion of the wagering game is presented upon the occurrence of an event.

19. The machine-readable medium of claim 18, wherein the event comprises a bonus round, an occurrence of a symbol or earning credits that exceed a predetermined threshold.

20. The machine-readable medium of claim 15, wherein the method further comprises presenting the second portion of the wagering game in accordance with a changed set of view characteristics.

21. The machine-readable medium of claim 20, wherein the set of view characteristics include perspective, position or zoom level.

22. The machine-readable medium of claim 15, wherein the method further comprises generating a path for a graphical object through a wagered outcome to a generated outcome.

23. A machine-readable medium having machine executable instructions stored thereon that when executed, cause one or more processors to execute a method, the method comprising:

presenting, on a display device, a wagering game upon which monetary value may be wagered;

presenting, on the display device, a first portion of the wagering game from a first perspective in accordance with a first rate of motion through time;

generating a path for the graphical object through a wagered outcome to a generated outcome using reverse mapping; and presenting, on the display device, a second portion of the wagering game, depicting the first portion of the wagering game from a second perspective that is different from the first perspective, in accordance with a second rate of motion through time, wherein the second rate of motion through time is different from the first rate of motion through time.

24. The machine-readable medium of claim 23, further comprising instructions operable to receive a wager from a first player and wherein the instructions for returning to a previous point in time are executed in response to input received from a second player.

25. The machine-readable medium of claim 23, wherein the reverse mapping includes generating the path starting from the generated outcome and ending at a starting point such that the path is near or through the wagered outcome.

* * * * *

UNITED STATES PATENT AND TRADEMARK OFFICE

CERTIFICATE OF CORRECTION

PATENT NO. : 8,657,671 B2
APPLICATION NO. : 12/742224
DATED : February 25, 2014
INVENTOR(S) : Ansari et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 488 days.

Signed and Sealed this
Twenty-ninth Day of September, 2015

Michelle K. Lee

Michelle K. Lee
*Director of the United States Patent and Trademark Office*